(12) United States Patent
Roychoudhury et al.

(10) Patent No.: US 6,328,936 B1
(45) Date of Patent: Dec. 11, 2001

(54) CATALYTIC REACTOR FOR PROMOTING A CHEMICAL REACTION ON A FLUID PASSING THERETHROUGH

(75) Inventors: Subir Roychoudhury; William C. Pfefferle, both of Madison, CT (US)

(73) Assignee: Precision Combustion, Inc., New Haven, CT (US)

( * ) Notice: Subject to any disclaimer, the term of this patent is extended or adjusted under 35 U.S.C. 154(b) by 0 days.

(21) Appl. No.: 09/412,270

(22) Filed: Oct. 5, 1999

(51) Int. Cl.⁷ ................................. F01N 3/10; F01N 3/28
(52) U.S. Cl. ......................... 422/174; 422/177; 422/180
(58) Field of Search ........................... 422/171, 177, 422/174, 179, 180; 60/299, 300; 55/DIG. 30

(56) References Cited

U.S. PATENT DOCUMENTS

| | | |
|---|---|---|
| 5,146,743 | 9/1992 | Maus et al. .......................... 60/274 |
| 5,229,079 | 7/1993 | Harada et al. ....................... 422/174 |
| 5,465,573 * | 11/1995 | Abe et al. ............................ 422/174 |
| 5,538,697 * | 7/1996 | Abe et al. ............................ 422/174 |

* cited by examiner

Primary Examiner—Hien Tran
(74) Attorney, Agent, or Firm—McCormick, Paulding & Huber LLP

(57) ABSTRACT

A catalytic reactor with an auxiliary heating structure for raising the temperature of a fluid passing therethrough whereby the catalytic reaction is promoted. The invention is a apparatus employing multiple electrical heating elements electrically isolated from one another by insulators that are an integral part of the flow path. The invention provides step heating of a fluid as the fluid passes through the reactor.

10 Claims, 1 Drawing Sheet

CATALYTIC REACTOR FOR PROMOTING A CHEMICAL REACTION ON A FLUID PASSING THERETHROUGH

CROSS-REFERENCES

This invention was made with government support under NASA SBIR Phase II contract NAS8-40573. The U.S. government has certain rights in this invention.

BACKGROUND OF THE INVENTION

1. Field of the Invention

The present invention is a catalytic reactor for promoting a chemical reaction on a fluid passing therethrough. More specifically, the apparatus is a structure for step-wise heating of a fluid passing therethrough such that the fluid obtains or maintains a temperature wherein the desired chemical reaction, in the presence of a catalyst, can occur.

2. Brief Description of the Related Art

Catalytically supported reactions are used in numerous applications, with the automotive converter being one of the more well known. Catalyst characteristics dictate that these reactions occur within a given temperature range with the operational temperature range being chemistry dependent. When a catalyst reaches its operational temperature range it is said to light-off; prior to reaching light-off the catalyst is too cold to support the desired reaction. After light-off the catalyst temperature must be maintained to support the reaction.

Several methods have been employed to raise the temperature of the catalyst to achieve light-off and/or maintain operational temperature. One common method uses the heat energy in the fluid on which the chemical reaction is to occur. This approach, common in automotive converters, imparts the heat in the exhaust gas, resulting from the combustion in the engine, to the catalyst in the downstream catalytic converter.

A second method which is fluid independent employs an auxiliary heat source. The most common auxiliary source being powered by electricity. In this method, the substrate that supports the catalyst is an electrically conducting material that heats up by its electrical resistance when an electric potential is put across the substrate. Auxiliary heating sources are used primarily where the extraction of heat from the fluid is either too slow to effectuate a timely light-off of the catalyst, or the heat of the fluid is below the light-off temperature of the catalyst.

Auxiliary heating sources, as the name implies, are additional systems to the primary system. It is, therefore, critical that these auxiliary heating systems be highly efficient in bringing the catalyst to or maintaining the catalyst at the appropriate operational temperature. The art is well aware of the efficiency of extremely short-channel, metal-substrate catalysts. When these catalysts are bundled, however, the resulting elements have extremely low resistance thus making electrical heating impractical, due to large current requirements for a given electrical potential resulting in excessive power supplies and cables. Currently, spacing is used to solve this problem, but the resulting devices are extremely long. A method of efficient bundling that permits auxiliary electrical resistive heating is required.

SUMMARY OF THE INVENTION

The present invention is a catalytic reactor for promoting a chemical reaction on a fluid passing therethrough. The invention is comprised of a plurality of heater elements with each element having multiple flow channels. The channels of the heater elements are aligned such that a fluid passing through the reactor passes through each heater element in turn, thereby step-wise heating the fluid.

In the present embodiment of the invention, the heater element is made of a single piece of expanded metal. This, however, should not be limiting. For this invention a heater element can have any number of layers, for example two or three layers of expanded metal. A heater element is simply an element that heats up uniformly as a unit.

The heater elements are electrically isolated from one another by at least one insulator. Like the heater element, the insulator has multiple flow channels. The insulator flow channels are oriented to the flow channels of the heater elements, such that the fluid flows through both the heater element and the insulator.

The present invention can also incorporate a catalytic feature. The catalytic feature can be associated with the at least one heater element, at least one insulator element, a separate downstream catalyst or any combination of the above. The present embodiment incorporates a catalyst feature in the heater elements, the insulator elements and a downstream catalyst. In this embodiment, the insulator has the dual function of insulating and supporting the catalyst.

The heater elements of the present invention are made from material that is electrically conductive. The insulators are made from woven silica yarn, which is electrically non-conductive. The heater elements are connected electrically, in series being preferred, with the insulators assuring no electrical short circuits between the heater elements. For operation, each end of the electrical circuit is connected to an electrical power source. In the case of the present invention, the power source was direct current.

The catalyst chosen for use in the invention is application dependent. The specific application of the present invention is as a component of an air purification system, therefore the catalyst employed has as its active ingredients platinum and palladium. For the present application, the catalyst was deposited on both the heater elements and the insulator elements.

To provide a sealed flow path through the catalytic reactor, gaskets were incorporated. A gasket is only one method of sealing the reactor flow path. Gaskets are used as required.

In the present embodiment of the invention, three downstream catalysts were added. The downstream catalyst or catalysts can be of any design. In the present invention, the first downstream catalyst was merely additional catalytically coated insulator elements. Again, gaskets were employed to assure the integrity of the flow path. The second and third downstream catalyst were packets of Microlith elements, such as those found in U.S. Pat. No. 5,051,241, incorporated herein by reference.

DETAILED DESCRIPTION OF THE PREFERRED EMBODIMENTS OF THE INVENTION

Figure 1:
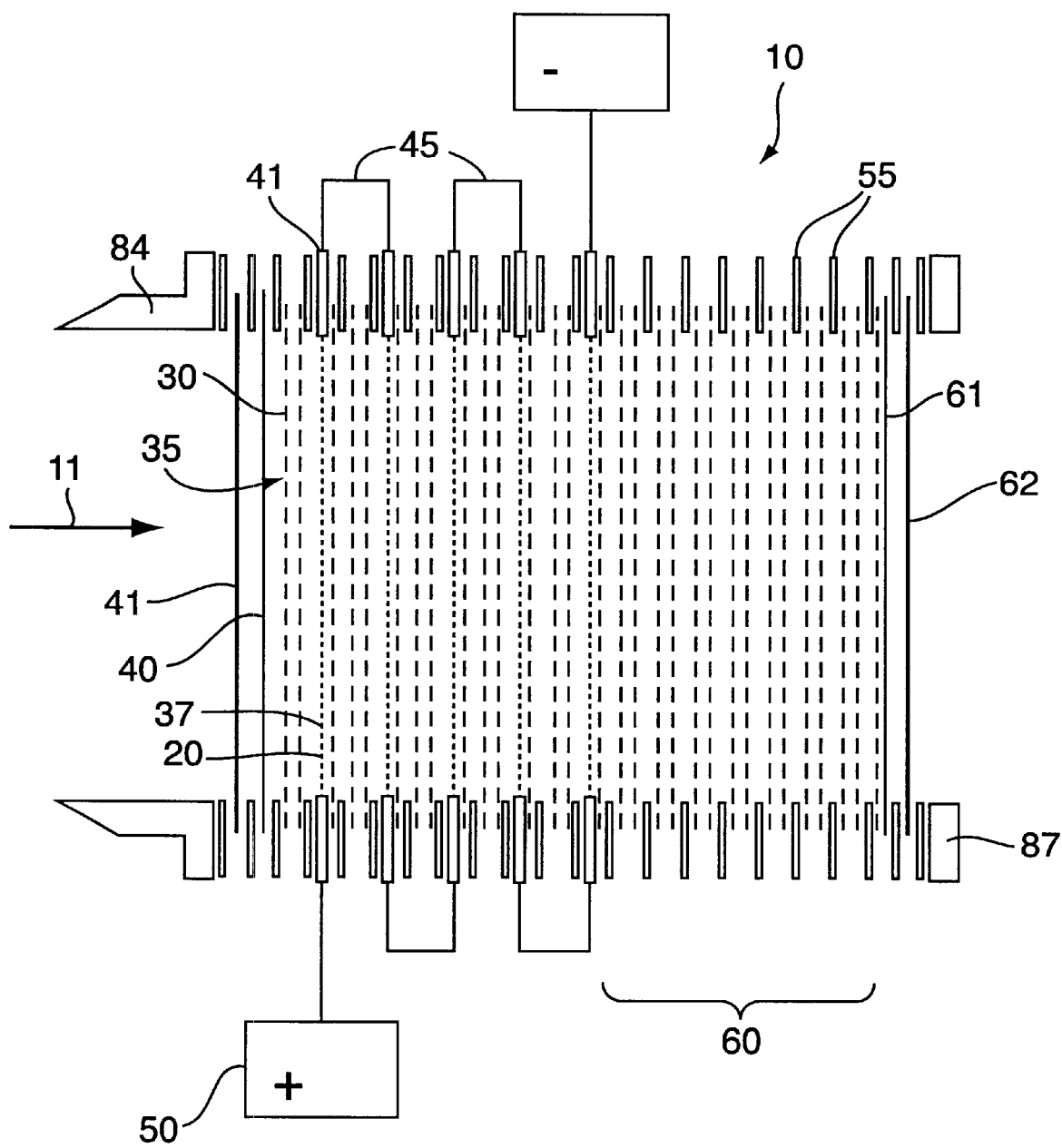
FIG. 1 is a cross-sectional representation of the present invention. For illustration purposes space has been left between the various elements.

FIG. 1 is a cross-sectional representation of the catalytic reactor 10. Catalytic reactor 10 is composed of at least two heater elements 20, each defining a plurality of first flow channels 37, with each heater element separated from the other by at least one insulator element 30, each defining a plurality of second flow channels 35. The specific number of heater elements is application dependent based on the desired temperature rise. In the current embodiment, the heater elements 20 are electrically connected in series by electrical connectors 45 such that a single electrical potential 50 can be used to resistively heat all the heater elements. The channels of the heater elements 20 and at least one insulator element 30 are aligned in a common direction of flow 11, such that the gas passes through both the heater elements 20 and the insulator elements 30. In the case of the present embodiment, gaskets 55 are employed where necessary to maintain the integrity of the flow path.

The heater elements 20 are catalytically active as are at least one insulator element 30. The catalyst or catalysts selected are application dependent and are selected just as one skilled in the art would select a catalyst. Catalytic activity can be achieved in numerous ways such as deposition of the catalyst on the a support, such as used in this embodiment, or making the support from catalytic material or material incorporating catalytic material.

In the embodiment shown, the invention is placed into a multi-stage catalytic reactor. Upstream of the invention are a first upstream catalyst 41 and a second upstream catalyst 40. Downstream of the invention are three catalysts-a first downstream catalyst 60, a second downstream catalyst 61, and a third downstream catalyst 62. The use of multi-stage catalyst is application dependent and is shown here to give an appreciation for how the invention might be used in a multi-stage catalytic reactor. It should be noted that at least one insulator element 30 and gaskets 55 were employed as needed to assure the electrical isolation of heater elements 20 and the integrity to the flow path.

The number of heater elements is a function of the desired temperature rise in the gas passing therethrough. In one application a temperature rise of 40 degrees C was desired. The heaters were to be heated by electrical resistance. The electrical constants were as follows: Operating voltage (V)—28 VDC; Target power (P)—168 Watts (±8 Watts); Maximum length of each heater element—3"; and Maximum width of each heater element—3.5". These requirements dictated that the resistance (R) for the entire heater assembly had to be 4.45 Ω (R=V__/P). As the device had to fit in a cylinder that limited the width of the elements to approximately 3.5 inches, the variables in the reactor design were the length and width of each heater element, and the total number of heater elements. As resistance is directly proportional to the length and inversely proportional to the width and the material has unit cells in both directions, the resistance can be controlled only down to the precision of the cell size by choosing the length or width of the material. The approximate resistance of the chosen material for a width of 3.5" was measured to be 0.30 Ω/in. The heater was sized to have five, 3.5 inch wide elements, each 3 inches in length, connected in series to give a total length of 15 inches. This results in a total resistance of 4.5 Ω, and a predicted power usage of 174 Watts at 28 VDC, which is within the range for the target power.

The invention is constructed by stacking the heater elements, gaskets, and insulators as shown in FIG. 1. In the present embodiment, the heater elements were connected in electrical series by electrical connectors 45 using the previously described terminals 41. A series connection was chosen since the heater elements have a low resistance and a series configuration increase the total resistance of the device. Based on a fixed voltage for the application, this lowered the amperage requirement. Wiring of the elements in series, parallel, or some combination is, however, application dependent and standard heater design procedures can be employed. The at least one insulator element 30 in the present invention are used to assure that a short circuit does not exist between the adjacent heater elements, therefore at least one insulator element 30 must be placed between any two heater elements.

The invention is shown with two upstream catalysts and three downstream catalysts. The number and configuration is application dependent and presented here for illustration only. The first downstream catalyst is constructed from additional insulator elements 30 and gaskets 55. The first upstream catalyst 41 and second downstream catalyst 62 are constructed from woven wire mesh.

The entire assembly is compressed between the two end plates, 84 and 87 by bolts (not shown), forming an integral flow path, such that the gas enters the assembly through the upstream end plate 84 and exits through the downstream end plate 87.

Although the present invention has been described in considerable detail with reference to certain preferred versions thereof, other versions are possible. Therefore, the spirit and scope of the appended claims should not be limited to the description of the preferred version contained herein.

What is claimed is:

1. A catalytic reactor for promoting a chemical reaction on a fluid passing therethrough comprising:
   at least two heater elements, each defining a plurality of first flow channels:
      catalytic means associated with at least one of said at least two heater elements for promoting a chemical reaction with said fluid passing therethrough;
      at least one insulator defining a plurality of second flow channels positioned between any two heater elements, wherein the heater elements and at least one insulator are compressed together;
      said first and second flow channels being aligned relative to one another such that said fluid passes in turn through said heater elements and at least one said insulator;
      and wherein said heater elements, during operation, impart sufficient heat to said fluid to promote catalysts of at least a portion of said fluid passing through the reactor.

2. The reactor of claim 1 wherein the heater elements are electrically conductive and further comprising electrical connectors connected between said heater elements connecting said heater elements in electrical series and means for connecting said series of said heater elements to an electrical power source.

3. The reactor of claim 2 further comprising catalytic means associated with at least one of said at least one insulator for promoting a chemical reaction with said fluid passing therethrough.

4. The reactor of claim 1 further comprising catalytic means associated with at least one of said at least one insulators for promoting a chemical reaction with said fluid passing therethrough.

5. A catalytic reactor for promoting a chemical reaction on a fluid passing therethrough comprising:
   at least two heater elements, each defining a plurality of first flow channels:
      at least one insulator defining a plurality of second flow channels positioned between any two heater elements wherein the heater elements and at least one insulator are compressed together;

catalytic means associated with at least one of said at least one insulator for promoting a chemical reaction with said fluid passing therethrough said insulator;

said first and second flow channels being aligned relative to one another such that said fluid passes in turn through said heater elements and said at least one insulator;

and wherein said heater elements, during operation, impart sufficient heat to said fluid to promote catalysts of at least a portion of said fluid passing through the reactor.

6. The reactor of claim 5 wherein the heater elements are electrically conductive and further comprising electrical connectors connected between said heater elements connecting said heater elements in electrical series and means for connecting said series of said heater elements to an electrical power source.

7. The reactor of claim 6 further comprising catalytic means associated with at least one of said heater elements for promoting a chemical reaction with said fluid passing through said heater element.

8. The reactor of claim 5 further comprising catalytic means associated with at least one of said heater elements for promoting a chemical reaction with said fluid passing through said heater element.

9. A catalytic reactor comprising:

at least two heater elements, each defining a plurality of first flow channels:

at least one insulator defining a plurality of second flow channels positioned between any two heater elements, wherein the heater elements and at least one insulator are compressed together;

said first and second flow channels being aligned relative to one another such that said fluid passes in turn trough said heater elements and said at least one insulator; and at least one catalyst located downstream of said heater elements; and wherein said heater elements, during operation, impart sufficient heat to said fluid to promote catalysts of at least a portion of said fluid passing through the reactor.

10. The reactor of claim 9 wherein the heater elements are electrically conductive and further comprising electrical connectors connected between said heater elements connecting said heater elements in electrical series and means for connecting said series of said heater elements to an electrical power source.

* * * * *

UNITED STATES PATENT AND TRADEMARK OFFICE
CERTIFICATE OF CORRECTION

PATENT NO. : 6,328,936 B1  
DATED : December 11, 2001  
INVENTOR(S) : Subir Roychoudhury and William C. Pfefferle Page 1 of 1

It is certified that error appears in the above-identified patent and that said Letters Patent is hereby corrected as shown below:

Drawings,  
Figure 1, the numeral "41" should be removed and the numeral -- 46 -- inserted therefor.

Column 3,  
Line 20, after the word "on" remove the word "the".  
Line 64, after the word "terminals" remove the numeral "41" and insert -- 46 -- therefor.

Signed and Sealed this

Thirtieth Day of April, 2002

Attest:

Attesting Officer

JAMES E. ROGAN  
Director of the United States Patent and Trademark Office